United States Patent
Ericsson et al.

(10) Patent No.: US 9,575,478 B2
(45) Date of Patent: Feb. 21, 2017

(54) CONFIGURING A SET OF DEVICES OF A STRUCTURE

(71) Applicants: Bo E. Ericsson, Los Gatos, CA (US); Tanuj Mohan, Mountain View, CA (US); Saurabh Gupta, Sunnyvale, CA (US)

(72) Inventors: Bo E. Ericsson, Los Gatos, CA (US); Tanuj Mohan, Mountain View, CA (US); Saurabh Gupta, Sunnyvale, CA (US)

(73) Assignee: enLighted, Inc., Sunnyvale, CA (US)

( * ) Notice: Subject to any disclaimer, the term of this patent is extended or adjusted under 35 U.S.C. 154(b) by 353 days.

(21) Appl. No.: 14/040,640

(22) Filed: Sep. 28, 2013

(65) Prior Publication Data

US 2014/0031987 A1  Jan. 30, 2014

Related U.S. Application Data

(63) Continuation-in-part of application No. 12/874,331, filed on Sep. 2, 2010, now Pat. No. 8,587,225, which is
(Continued)

(51) Int. Cl.
*G05B 15/00* (2006.01)
*H05B 37/02* (2006.01)
(Continued)

(52) U.S. Cl.
CPC ............ *G05B 15/02* (2013.01); *H05B 37/0245* (2013.01); *G01S 5/16* (2013.01)

(58) Field of Classification Search
CPC ............ G01S 5/16; G01S 11/12; G05B 15/02; H05B 37/0245; H05B 37/0218; H05B 37/0227; H05B 37/0272; H04W 64/003; Y02B 20/46
(Continued)

(56) References Cited

U.S. PATENT DOCUMENTS 5,101,141 A   3/1992  Warner et al.
5,179,324 A   1/1993  Audbert
(Continued)

FOREIGN PATENT DOCUMENTS

WO   WO 2012001428    1/2012

OTHER PUBLICATIONS

PCT Notification of Transmittal of the International Search Report and the Written Opinion of the International Searching Authority, or the Declaration, International Application No. PCT/US14/26201, Dated Mar. 13, 2014.
(Continued)

*Primary Examiner* — Kenneth M Lo
*Assistant Examiner* — Yuhui R Pan
(74) *Attorney, Agent, or Firm* — Brian R. Short

(57) ABSTRACT

Systems, methods and apparatuses for configuring a set of devices of a structure are disclosed. One method includes loading a structure plan to a mobile computing device, wherein the structure plan is associated with the structure, communicating, by the mobile computing device, with one or more of the set of devices, communicating, by each of the one or more of the set of devices, a device identifier and proximity dependent information of the device back to the mobile computing device, wherein the proximity dependent information allows the mobile computing device to estimate a proximate location of the device, and placing, by the mobile computing device, each of the one or more of the set of devices on the structure floor plan based at least in part on the proximity dependent information.

19 Claims, 5 Drawing Sheets

Related U.S. Application Data a continuation-in-part of application No. 12/584,444, filed on Sep. 5, 2009, now Pat. No. 8,457,793.

(60) Provisional application No. 61/790,037, filed on Mar. 15, 2013.

(51) Int. Cl.
*H04W 24/00* (2009.01)
*G05B 15/02* (2006.01)
*G01S 5/16* (2006.01)

(58) Field of Classification Search
USPC ............... 700/275; 315/154; 455/456.1
See application file for complete search history.

(56) References Cited

U.S. PATENT DOCUMENTS

| | | |
|---|---|---|
| 5,191,265 A | 3/1993 | D'Aleo et al. |
| 5,283,516 A | 2/1994 | Lohoff |
| 5,812,422 A | 9/1998 | Lyons |
| 6,057,654 A | 5/2000 | Cousy et al. |
| 6,188,181 B1 | 2/2001 | Sinha et al. |
| 6,342,994 B1 | 1/2002 | Cousy et al. |
| 6,548,967 B1 | 4/2003 | Dowling et al. |
| 7,309,985 B2 | 12/2007 | Eggers et al. |
| 7,348,736 B2 | 3/2008 | Piepgras et al. |
| 7,382,271 B2 | 6/2008 | McFarland |
| 7,437,596 B2 | 10/2008 | McFarland |
| 7,550,931 B2 | 6/2009 | Lys et al. |
| 7,566,137 B2 | 7/2009 | Veskovic |
| 7,623,042 B2 | 11/2009 | Huizenga |
| 7,792,956 B2 | 9/2010 | Choong et al. |
| 7,925,384 B2 | 4/2011 | Huizenga et al. |
| 8,344,665 B2 | 1/2013 | Verfuerth et al. |
| 8,368,321 B2 | 2/2013 | Chemel et al. |
| 8,571,411 B2 | 10/2013 | Pederson et al. |
| 8,796,958 B2 | 8/2014 | Billig et al. |
| 8,860,316 B2 | 10/2014 | Barrilleaux |
| 9,006,996 B2 | 4/2015 | Mohan |
| 9,351,381 B2 | 5/2016 | Verfuerth et al. |
| 2004/0002792 A1 | 1/2004 | Hoffknecht |
| 2004/0014475 A1* | 1/2004 | Saito ............... H04L 29/1232 455/445 |
| 2005/0169643 A1 | 8/2005 | Franklin et al. |
| 2005/0174960 A1* | 8/2005 | Perlman ............... H04W 88/04 370/328 |
| 2006/0074494 A1* | 4/2006 | McFarland ............ G05B 15/02 700/1 |
| 2006/0275040 A1 | 12/2006 | Franklin |
| 2007/0057807 A1 | 3/2007 | Walters et al. |
| 2007/0061050 A1 | 3/2007 | Hoffknecht |
| 2007/0086128 A1 | 4/2007 | Lane et al. |
| 2007/0215794 A1 | 9/2007 | Cernasov et al. |
| 2007/0291483 A1 | 12/2007 | Lys |
| 2008/0185977 A1 | 8/2008 | Veskovic et al. |
| 2008/0215235 A1* | 9/2008 | Strassenburg-Kleciak G01C 21/32 701/532 |
| 2008/0218087 A1* | 9/2008 | Crouse ............... H05B 37/0245 315/131 |
| 2008/0244104 A1 | 10/2008 | Clemente |
| 2008/0265796 A1 | 10/2008 | Null |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2009/0267540 A1 | 10/2009 | Chemel et al. |
| 2010/0026479 A1 | 2/2010 | Tran |
| 2010/0034386 A1 | 2/2010 | Choong et al. |
| 2010/0135186 A1 | 6/2010 | Choong et al. |
| 2010/0264846 A1 | 10/2010 | Chemal et al. |
| 2010/0270933 A1 | 10/2010 | Chemal et al. |
| 2010/0295482 A1 | 11/2010 | Chemal et al. |
| 2010/0301777 A1 | 12/2010 | Chemal et al. |
| 2011/0031897 A1 | 2/2011 | Henig et al. |
| 2011/0183685 A1 | 7/2011 | Burton et al. |
| 2011/0199020 A1 | 8/2011 | Henig et al. |
| 2012/0130632 A1* | 5/2012 | Bandyopadhyay .... G01C 17/38 701/446 |
| 2012/0293075 A1 | 11/2012 | Engelen et al. |
| 2013/0131882 A1 | 5/2013 | Verfuerth et al. |
| 2013/0293877 A1 | 11/2013 | Ramer et al. |
| 2013/0326583 A1* | 12/2013 | Freihold ............ G06F 3/04815 726/3 |

OTHER PUBLICATIONS

Shin et al. IEEE Transactions on Systems, Man, and Cybernetics—Part C: Applications and Review. vol. 42, No. 6. Nov. 2012, Titled "Unsupervised Construction of an Indoor Floor Plan Using a Smartphone".

Jung et al. "Emotional Image Processing Using Sensors in Mobile Device", 2013 IEE, 3 pages.

\* cited by examiner

CONFIGURING A SET OF DEVICES OF A STRUCTURE

RELATED APPLICATIONS

This patent application is a continuation-in-part (CIP) of U.S. patent application Ser. No. 12/874,331, filed Sep. 2, 2010, and claims priority to U.S. Provisional Patent Application No. 61/790,037, filed Mar. 15, 2013, which are all herein incorporated by reference.

FIELD OF THE EMBODIMENTS

The described embodiments relate generally to a structure plan of a structure. More particularly, the described embodiments relate to apparatuses, methods and systems of configuring a set of devices of a structure on a plan, and placement of the device on the plan.

BACKGROUND

Lighting control can be used to automatically control lighting under certain conditions, thereby conserving power. However, lighting control, specifically advanced lighting controls have not been widely adopted in the general commercial market because the installation, setup related costs and complexity have made these lighting systems prohibitively expensive for most commercial customers.

It is desirable to have methods, systems and apparatuses for placing devices of a structure on a plan.

SUMMARY

An embodiment includes a method of configuring a set of devices of a structure. The method includes loading a structure plan to a mobile computing device, wherein the structure plan is associated with the structure, communicating, by the mobile computing device, with one or more of the set of devices, communicating, by each of the one or more of the set of devices, a device identifier and proximity dependent information of the device back to the mobile computing device, wherein the proximity dependent information allows the mobile computing device to estimate a proximate location of the device, and placing, by the mobile computing device, each of the one or more of the set of devices on the structure floor plan based at least in part on the proximity dependent information.

Another embodiment includes a mobile computing device configuring a set of devices of a structure. The mobile computing device is operative to upload a structure floor plan, wherein the structure floor plan is associated with the structure, communicate with one or more of the set of devices, receive from each of the one or more of the set of devices, a device identifier and proximity dependent information the device back to the mobile computing device, and place each of the one or more of the set of devices on the structure floor plan.

DETAILED DESCRIPTION

The described embodiments are embodied in an apparatuses, systems and methods of placing devices (such as, lighting fixtures or temperature control devices) on a plan (such as, a floor plan) of a structure (such as a building).

The lighting system can be used to generate a building floor plan, or to supplement an existing building floor plan. The light intensity of any of the lights can be changed. Proximate light sensors detect the change in light intensity. For at least some embodiments, a user of a mobile device senses the changes in light intensity of the lights, and records the locations of the lights.

Figure 1A:
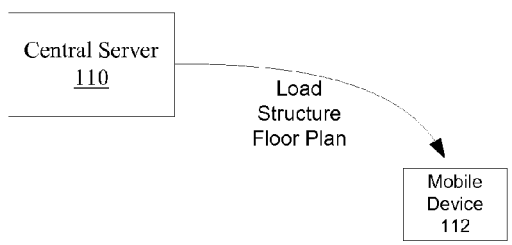
FIG. 1A shows a mobile computing device downloading a plan of a structure, according to an embodiment.

FIG. 1A shows a mobile computing device 112 downloading a plan of a structure from a central server 110, according to an embodiment. The structure can include, for example, a building, a parking lot, or any other structure that might include lighting devices or any other devices, such as, temperature and environmental control units.

For an embodiment, the plan provides for placement of the devices, but may not include exact or precise knowledge of which devices are placed at which location within the structure. That is, for example, the plan may provide approximate location of a device, but may not include information of which device is at which approximate location. The mobile computing device can use this information as a first data point in determining the precise locations of each of the devices within the structure.

Figure 1B:
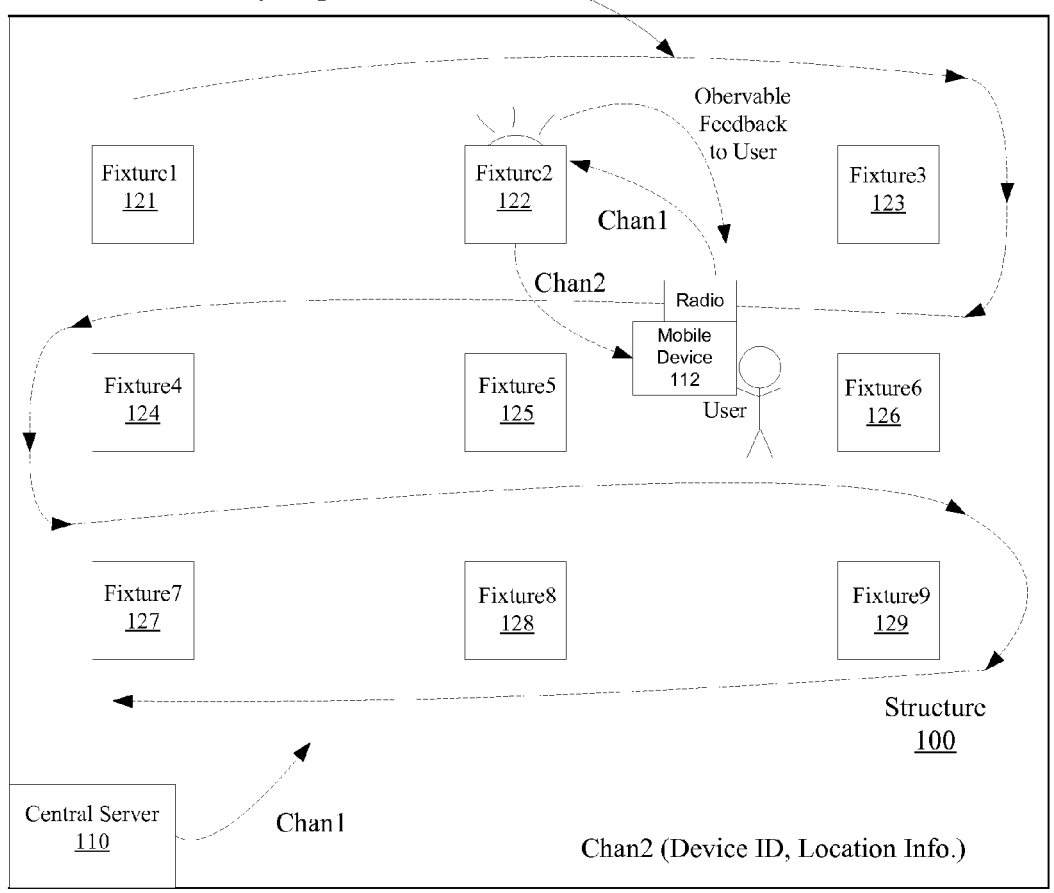
FIG. 1B shows a mobile computing device collecting information about devices within a structure, and placing the devices on the downloaded plan of the structure, according to an embodiment.

FIG. 1B shows a mobile computing device collecting information about devices within a structure, and placing the devices on the downloaded plan of the structure, according to an embodiment. The mobile device can include, for example, a smart mobile phone (such as an iPhone) or a laptop personal computer (which possibly include GPS capability). The mobile device can be used to communicate information from the mobile device to a sensor device using radio technology or other means of communications. This is, for example, to specify the location of the sensor, give a command to a sensor, and associate two or more sensors. Additionally, the mobile device can receive communications from a sensor device using radio technology or other means of communications. This allows a sensor device to be identified (and location recorded), give commands (such as direct motion), and provide results from an operation.

As shown, a structure 100 includes devices (such as fixtures 121-129) that are located within or around the structure. A general plan, or floor plan of the structure may generally provide approximate placement of the devices within the structure. For an embodiment, the mobile computing device 112 is transported around the structure. One exemplary path of travel is shown.

As the mobile computing device 112 travels around the structure 100, the mobile computing device 112 communicates within one or more of the devices 121-129. For an embodiment, the mobile computing device 112 includes a radio that allows the mobile computing device to communicate with each of the devices 121-129 through a communications channel utilized by, for example, the central server 110, or gateways associated with the central server 110 to communicate with the devices 121-129.

As the mobile computing device 112 moves within the structure, the mobile computing device 112 transmits a communications signal that is received by one or more of the devices 121-129. The devices 121-129 respond to the communications signal with a device identifier and proximity dependent information. For an embodiment, the device identifier includes a MAC (media access control) address of the device. For an embodiment, the proximity dependent information includes a Link Quality Indicator (LQI) of the received communication signal. The LQI includes, for example, a received signal strength indicator (RSSI) that provides an indication of how close the mobile computing device is to the particular device.

For at least some embodiments, the transmit power of the mobile device is varied which adjusts, the size of the set of responding devices. For example, by sufficiently reducing the transmit power of the mobile device, only the nearest device or devices (to the mobile device) will respond, a procedure which may further augment the process of locating a device on a floor plan. That is, for example, by varying the transmit power, an LQI list generated by the responding devices can be adjusted in length (that is, the number of responding devices is adjusted).

Further, at least some embodiments include adjusting the timing of the response of the devices. By adjusting the timing of the response of the devices, congestion due to near simultaneous responses can be alleviated. For an embodiment, the response times of the devices is randomly selected. For an embodiment, the response time of each device is selected based at least in part on a MAC (media access control) address of the device. For example, the response time of each device can be selected based on the last bit or byte of the MAC address of the device.

Typically, a user that is operating the mobile computing device will have a visual of the devices the mobile computing device is communicating with, but this is not required. Upon receiving responses back from one or more of the devices, the mobile computing device can attempt to place each of the devices on the plan or floor plan based on the proximity dependent information. For example, typically the device responding with the highest or best LQI is the device located most proximate to the mobile computing device. Therefore, the mobile computing device can place the device on the plan based on this information.

For an embodiment, the mobile computing device (or a user of the mobile computing device) can confirm the placement by sending a message to a specifically placed device using the device identification (such as, MAC address). The message indicates to the specific device to provide a user observable indicator. The user observable indicator can be visual, audible or any other means that allows for the mobile computing device or a user of the mobile computing device to confirm the indicator. Once the indicator has been received, the mobile computing device can confirm the placement of the device on the plan or floor plan.

Many different embodiments for device identification and placement are possible. One embodiment includes sending a command to the target device to identify itself, after which the device responds with a visual or audio or other signal. To facilitate mass verification of device identity and placement, an embodiment includes a bulk process that includes instructing each device in a floor plan, selected in an order (for an embodiment, the order includes a serpentine order), to respond and identify itself. For an embodiment, the serpentine order proceeds down one row of devices, verifying each device at a time, and when the last device in the row is processed, the last device on the next row is selected. This procedure ensures that the next device to be verified is physically close to the prior device. The process continues automatically and un-attended until all devices have been verified. To further speed up the verification and identification process (and verifying that radio communications is established with each device), at least some embodiment include capabilities to issue wireless commands to all devices to turn off/on the light simultaneously, or selected devices from the software user interface to do the same.

Figure 2A:
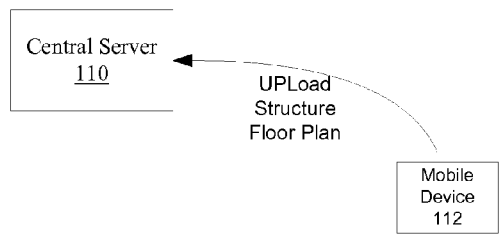
FIG. 2A shows a mobile computing device uploading a plan of a structure that includes placement of devices of the structure to a central server, according to an embodiment.

FIG. 2A shows a mobile computing device 112 uploading a plan of a structure that includes placement of devices of the structure, to a central server 110, according to an embodiment. After going through the described process of placing the devices of the structure on the plan, for an embodiment, the plan is then uploaded to the central server 110. The central server now has placement of each of the devices within the structure, and the device identifier (MAC address) of the device.

Figure 2B:
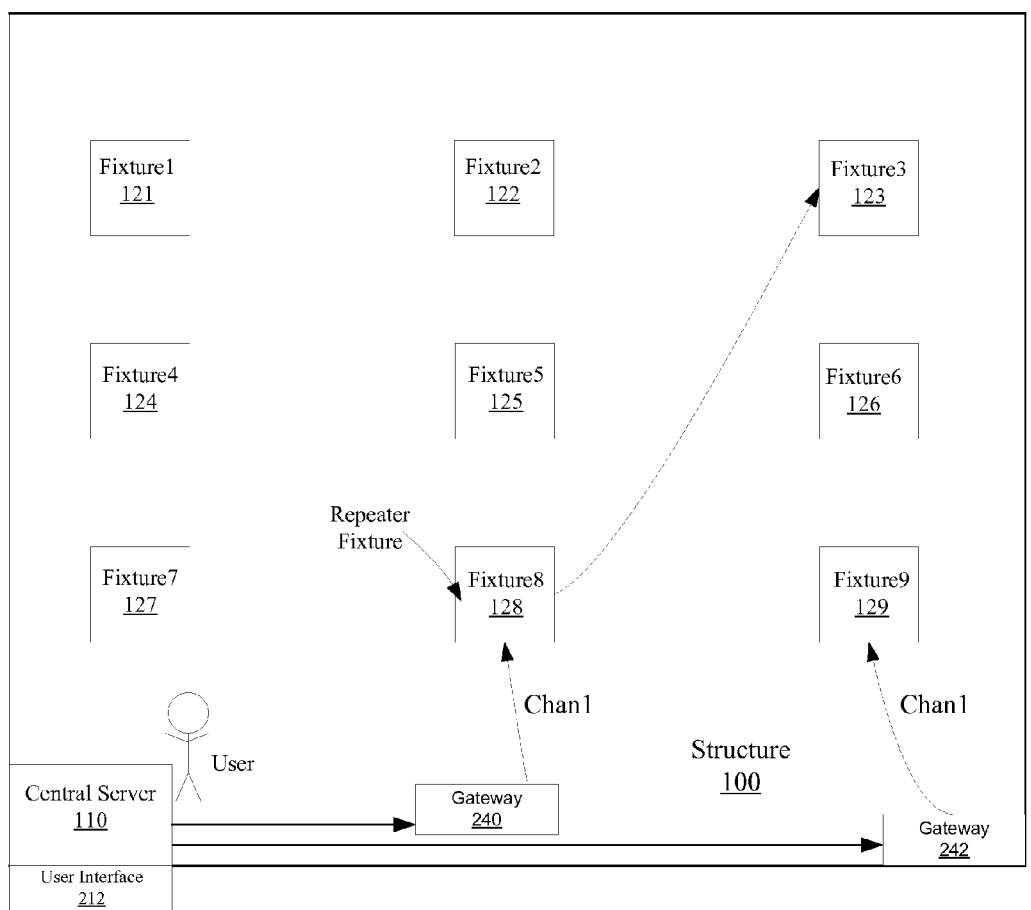
FIG. 2B shows a central server communicating with the devices of the structure after the devices have been placed in the structure, according to an embodiment.

FIG. 2B shows a central server 110 communicating with the devices 121-129 of the structure 110 after the devices 121-129 have been placed in the structure, according to an embodiment. For an embodiment, the central server 110 is network connected to gateways 240, 242. The gateways 240, 242 then communicate with the devices 121-129. Some of the devices 121-129 will naturally be located farther away, or otherwise have inferior quality links to the gateways 240, 242. Accordingly, for an embodiment, certain of the devices are designated as repeater devices. For an embodiment, certain of the devices are designated as repeater devices based on the proximity of the devices to gateways and other device as determined by the placement of the devices and gateways on the plan or floor plan. For example, in FIG. 2B, device 128 is designated as a repeater device. When, for example, gateway 240 communicates with device 123, the gateway 240 communicated through the repeater device 128 to the device 123.

Figure 3:
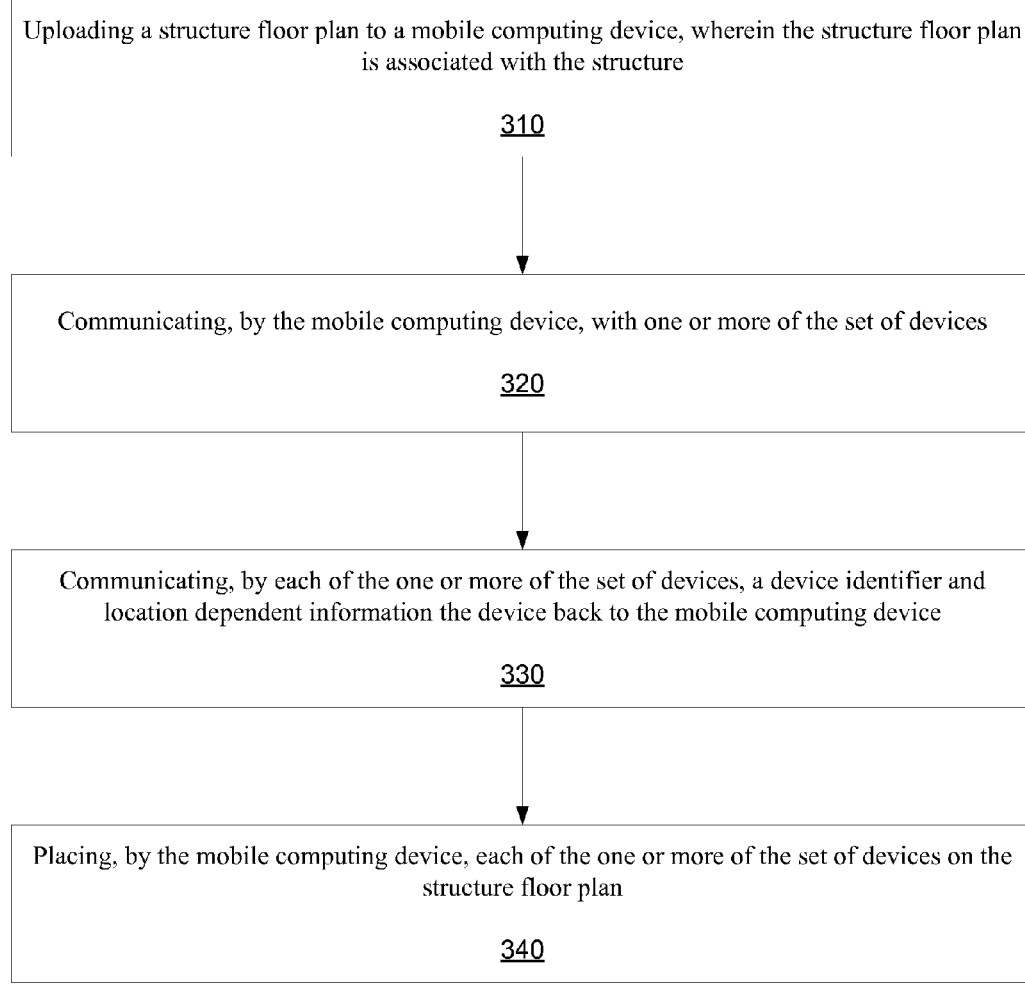
FIG. 3 is a flow chart that includes steps of a method of configuring a set of devices of a structure, according to an embodiment.

FIG. 3 is a flow chart that includes steps of a method of configuring a set of devices of a structure, according to an embodiment. A first step 310 includes loading a structure plan to a mobile computing device, wherein the structure plan is associated with the structure. A second step 320 includes communicating, by the mobile computing device, with one or more of the set of devices. A third step 330 includes communicating, by each of the one or more of the set of devices, a device identifier and proximity dependent information the device back to the mobile computing device, wherein the proximity dependent information allows the mobile computing device to estimate a proximate location of the device. A fourth step 340 includes placing, by the mobile computing device, each of the one or more of the set of devices on the structure floor plan based at least in part on the proximity dependent information.

An embodiment further includes each of the one or more of the set of devices, communicating an observable feedback to an operator of the mobile computing device. As previously describe, the observable feedback can be visual, audible, or any other means of feedback that the user of the mobile computing device, or the mobile computing device itself can receive, and therefore, confirm placement of the device providing the observable feedback.

For an embodiment, the mobile computing device includes a user interface that more readily allows the user of the mobile computing device to confirm locations of each of the devices. For an embodiment, the user interface of the mobile computing device provides an in-range list of devices. The in-range list includes the devices that are within the communication range of, for example, wireless communication from the mobile computing device to the devices. For an embodiment, the list of devices of the in-range list, are listed in an estimated order of proximity to the mobile computing device. The proximity can be estimated, for example, based on the link quality between the mobile computing device and each of the devices.

For an embodiment, the user interface allows the user to select a device from the list, and further, communicate a command to the device, wherein the device provides a user-observable feedback in response to being selected. Further, the user interface can easily allow the user to then select the next device of the list for placement confirmation.

For an embodiment, once the mobile computing device has placed each of the devices on the plan, the mobile computing device then uploads the placement of each of the one or more of the set of devices on the structure floor plan to a central server. An embodiment can further include the central server confirming or supplementing the placements of one or more of the set of devices on the structure floor plan through activation of a user-selected device of the one or more of the set of device. An embodiment further includes providing a user-interface that depicts at least a portion of the structure floor plan and at least a portion of the set of devices, and further depicts the user-selected device, and further facilitates communication to the user-selected device. An embodiment further includes providing a capability to record meta data and other information (such as diagnostic data) about each device on a floorplan, either in the mobile device or central server or both. This capability enables, for example, a "punchlist" (a list of diagnostic problems) of the sensor devices to be created and maintained, which will simplify the repair process and overall maintenance of the sensor devices. That is, the responses of the devices to the communication by the mobile device can include information related to the operating condition and health of the device. The operating condition and health information of each device can be used by a system operator to schedule maintenance of the devices. The operating condition and health information of each device can be used to identify problem conditions associated with the devices.

For an embodiment, the mobile computing device communicates with the one or more of the set of devices through a wireless channel that a central server or a gateway uses to communicate with each of the set of devices. This saves resources because each of the devices already has the electronics required to communicate with the central server or gateways connected to the central server. That is, an extra channel for communication between the mobile computing device and each device is not required. An existing communication channel is utilized.

As previously described, and embodiment further includes physically transporting the mobile computing device about the structure, and the mobile computing device communicating with one or more of the set of devices. As previously described, the mobile computing device receives a device identifier and proximity dependent information back from the devices. For an embodiment, the proximity dependent information includes a received signal strength of communication received by the device. For an embodiment, the proximity dependent information includes a Link Quality Indicator of communication received by the device. For an embodiment, the device identifier includes a MAC address of the device.

As previously described, an embodiment further includes designating at least a portion of the set of devices as repeater devices, wherein repeater devices receive communication signals from either a gateway or another repeater device, and transmit the communication signals to another device. For an embodiment, the gateway device is located on the floor plan, and the portion of the set of devices are designated as repeater devices based on a proximity of the portion of the set of devices relative to the gateway.

While the devices have been described generally, for an embodiment, the devices are lighting fixtures that are controllable, for example, by the central server. Further, for at least some embodiment, the lighting fixtures include sensors.

An embodiment further includes a network setup being executed after the placement of the devices on the floor plan has been completed. The network setup can include associating certain devices with particular gateways, thereby establishing groups of devices. As described, the central controller can then communication with particular groups through corresponding gateways.

An embodiment further includes the central controller initiating or causing the devices to provide a sequential user observable feedback after all of the devices have been placed. That is, each device sequentially generates a user observable feedback that allows a user to confirm the placement of the devices. For example, the lighting of lighting devices can be sequentially performed to allow the user to confirm that each device has been properly placed on a floor plan of a building.

Figure 4:
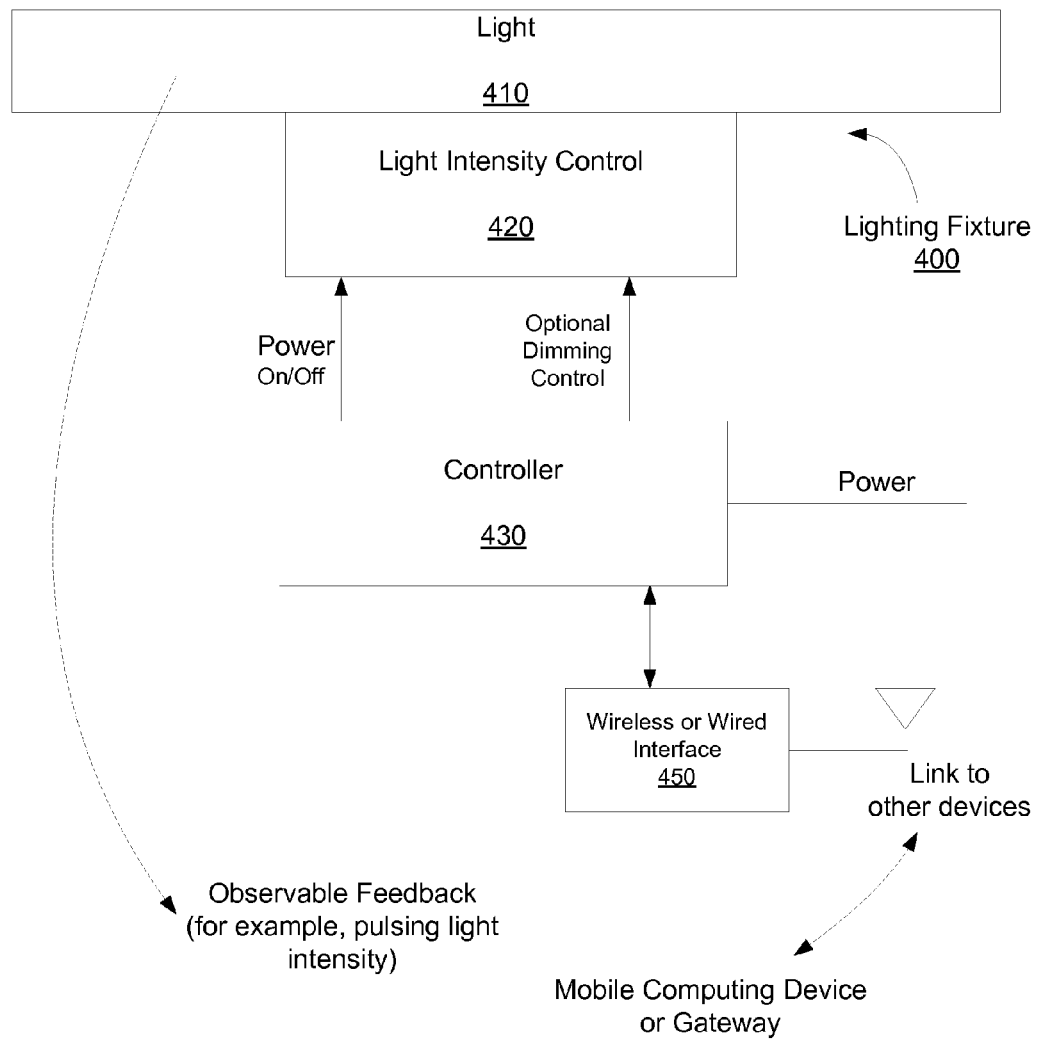
FIG. 4 shows a lighting device, according to an embodiment.

FIG. 4 shows a lighting device (lighting fixture 400), according to an embodiment. As shown, this embodiment includes a light 410, a light intensity controller 420, a controller 430, and a communications interface 450. The intensity of light emitted from the light is controlled by the light intensity controller 420 which can be of different forms depending, for example, if the light 410 is an LED (light emitting diode) or florescent light.

For at least some embodiments, the controller 430 is operative to communicate with external devices (such as, a gateway or the mobile computing device) through the communications interface 450. For an embodiment, the communications interface 450 includes a wireless communication interface.

The controller 430 is further operative to receive commands and react accordingly. For an embodiment, when the controller 430 receives a first command from the mobile computing device, the controller 430 transmits back to the mobile computing device the device identifies and proximity dependent information of the lighting fixture 400. Further the controller 430 can provide user observable feedback, thereby indicating to a user that the lighting fixture has received the first command. For an embodiment, the controller 430 is further operative to provide the user-observable feedback to the mobile computing device upon receiving communication specifically for the lighting fixture as identified by the device identifier (for example, MAC address). As described, the user-observable feedback can take one of many different forms, but one form includes controlling the intensity of emitted light, which can be observer by the user of the mobile computing device.

Figure 5:
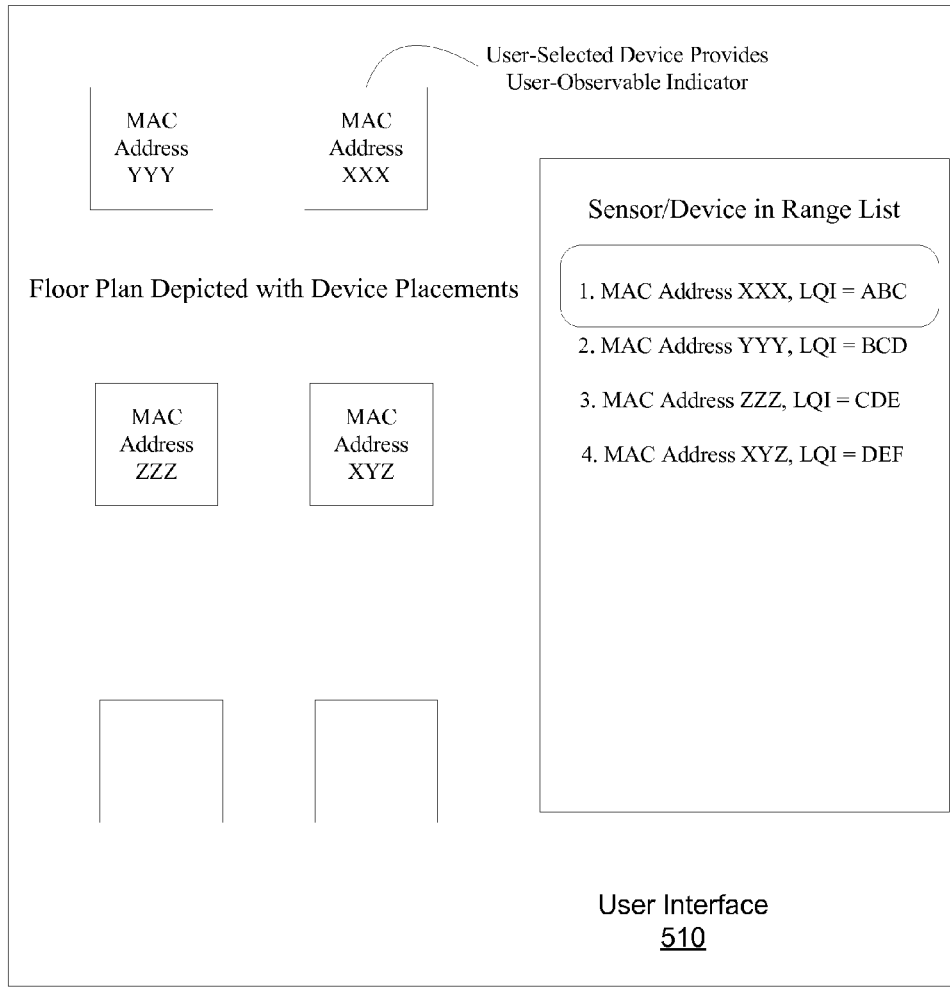
FIG. 5 shows a user interface of a mobile computing device that facilitates placements of the devices on the plan, according to an embodiment.

FIG. 5 shows a user interface 510 of a mobile computing device that facilitates placements of the devices on the plan, according to an embodiment. There are many different forms that the user interface can take. For an embodiment, the user interface includes at least a portion of a floor plan of a building (structure) in which placement of devices is being performed. The user interface can provide a visual depiction of the placed devices and their corresponding MAC addresses. The user can then select a device, and the mobile computing device sends the selected device a command. Upon receiving the command, the device provides the user observable feedback.

For an embodiment, the user interface includes a device in-range list. For an embodiment, the device in-range list orders the devices according to the signal quality of the communication signal receive from the mobile computing device. It can be inferred that the devices having the best link quality are the closest or most proximate to the mobile computing device. The user of the mobile computing device can then select a device from the device in-range list for confirmation of placement. Once confirmation of a device has been made, the list can then move to the next device on the list for confirmation.

As previously described, the in-range list can be varies or adjusted by varying or adjusting the transmit power of the mobile device. That is, by varying the transmit power of the mobile device, the number of devices that receive the communication from the mobile device is adjusted. Accordingly, the size of number of devices of the in-range list can by controllably adjusted. Further, the response times of the devices can be adjusted.

Although specific embodiments have been described and illustrated, the described embodiments are not to be limited to the specific forms or arrangements of parts so described and illustrated. The embodiments are limited only by the appended claims.

What is claimed:

1. A method of configuring a set of fixed devices of a structure, comprising:
    loading a structure floor plan to a mobile computing device, wherein the structure floor plan is associated with the structure, and wherein the structure floor plan provides approximate placement of the set of fixed devices within the structure, but does not include complete information of which fixed devices are placed at one or more approximate placement locations within the structure;
    communicating, by the mobile computing device, with one or more of the set of fixed devices, wherein the set of fixed devices each have a fixed location within the structure;
    communicating, by each of the one or more of the set of fixed devices, a device identifier and a proximity dependent information of the fixed device back to the mobile computing device, wherein the proximity dependent information of each of the one or more of the set of fixed devices allows the mobile computing device to estimate a proximate location of each of the one or more of the set of fixed devices;
    placing, by the mobile computing device, each of the one or more of the set of fixed devices on the structure floor plan based at least in part on the proxmity dependent information, wherein the placing supplements the structure floor plan with information about which fixed devices are placed at which of the one or more approximate placement locations of the loaded structure floor plan of the structure; and
    providing an in-range list of fixed devices on a user-interface of the mobile computing device based on the estimated proximate location of each of the one or more of the set of fixed devices, wherein the user interface allows a user to select a fixed device from the list, and further, communicate a command to the fixed device, wherein the fixed device provides a user-observable feedback in response to being selected, wherein observable feedback allows the user to identify and confirm the placement of the fixed device.

2. The method of claim 1, wherein the list of fixed devices are listed in an estimated order of proximity to the mobile computing device.

3. The method of claim 1, further comprising the mobile computing device uploading the placement and identification of each of the one or more of the set of fixed devices on the structure floor plan to a central server.

4. The method of claim 1, further comprising supplementing the placement of one or more of the set of fixed devices on the structure floor plan through activation of a user-selected fixed device of the one or more of the set of fixed devices.

5. The method of claim 1, further comprising providing a user-interface that depicts at least a portion of the structure floor plan and at least a portion of the set of fixed devices, and further depicts the user-selected fixed device, and further facilitates communication to the user-selected fixed device.

6. The method of claim 1, wherein the observable feedback is visual, audible, or physical.

7. The method claim 1, wherein the mobile computing device communicates with the one or more of the set of fixed devices through a wireless channel that a central server or a gateway uses to communicate with each of the set of fixed devices.

8. The method of claim 1, further comprising physically transporting the mobile computing device about the structure, and the mobile computing device communicating with one or more of the set of fixed devices.

9. The method of claim 1, wherein the proximity dependent information includes a received signal strength of communication received by the fixed device.

10. The method of claim 1, wherein the proximity dependent information includes a Link Quality Indicator of communication received by the fixed device.

11. The method of claim 1, wherein the device identifier includes a MAC address of the fixed device.

12. The method of claim 1, further comprising designating at least a portion of the set of fixed devices as repeater devices, wherein repeater devices receive communication signals from either a gateway or another repeater device, and transmit the communication signals to another fixed device.

13. The method of claim 12, wherein the gateway device is located on the floor plan, and the portion of the set of fixed devices are designated as repeater devices based on a proximity of the portion of the set of fixed devices relative to the gateway.

14. The method of claim 1, wherein the set of fixed devices includes lighting fixtures and sensors.

15. The method of claim 1, further comprising adjusting a transmit power of the communication by the mobile computing device, thereby adjusting a number of the one or more of the set of fixed devices that respond to the communication by the mobile computing device.

16. The method of claim 1, wherein a timing of the communication by each of the one or more of the set of fixed devices is selected based on a media access control (MAC) address of each of the one or more of the set of fixed devices.

17. A mobile computing device configuring a set of fixed devices of a structure, wherein the mobile computing device is operative to:
  upload a structure floor plan, wherein the structure floor plan is associated with the structure, and wherein the structure floor plan provides approximate placement of the set of fixed devices within the structure, but does not include complete information of which fixed devices are placed at one or more approximate placement location within the structure;
  communicate with one or more of the set of fixed devices, wherein the set of fixed devices each have a fixed location within the structure;
  receive from each of the one or more of the set of fixed devices, a device identifier and proximity dependent information of the fixed device, wherein the proximity dependent information allows the mobile computing device to estimate a proximate location of each of the one or more of the set of fixed devices;
  place each of the one or more of the set of fixed devices on the structure floor plan based at least in part on the proximity dependent information, wherein the placing supplements the structure floor plan with information about which fixed devices are placed at which of the one or more approximate placement locations of the loaded structure floor plan of the structure; and
  provide an in-range list of fixed devices on a user-interface of the mobile computing device based on the estimated proximate location of each of the one or more of the set of fixed devices, wherein the user interface allows the user to select a fixed device from the list, and further, communicate a command to the fixed device, wherein the fixed device provides a user-observable feedback in response to being selected, wherein observable feedback allows the user to identify and confirm the placement of the fixed device.

18. The mobile communication device of claim 17, further comprising adjusting a transmit power level of the communicating with the one or more of the set of fixed devices, thereby adjusting a number of the one or more of the set of fixed devices that receive the communication from the mobile communication device.

19. The mobile communication device of claim 17, wherein a timing of the communicating received back from each of the one or more of the set of fixed devices is based at least in part on a media access control (MAC) address of the fixed device.

* * * * *